April 11, 1950     R. T. KEATING     2,503,554
THERMOSTAT
Filed Feb. 27, 1948
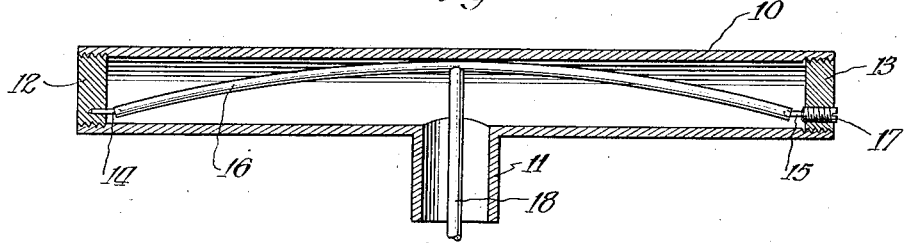
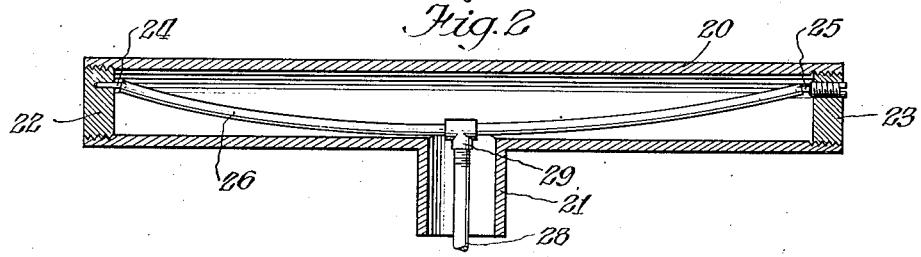
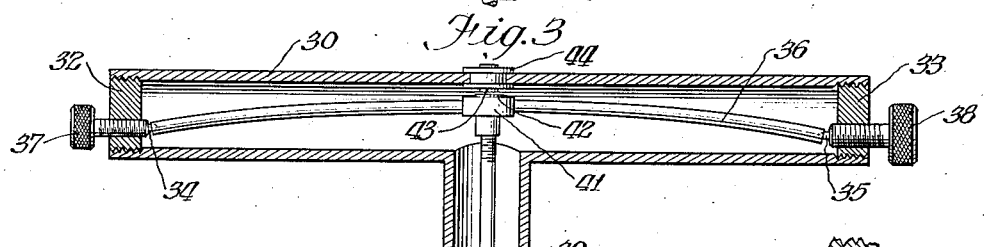
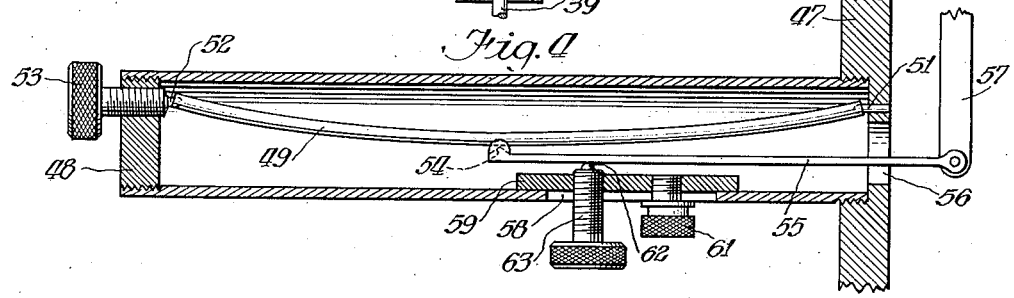
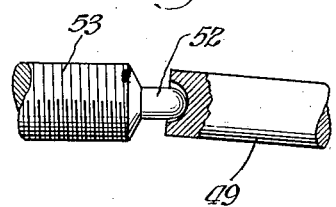
Inventor:
Richard T. Keating.
By: Clarence J. Loftus
Attorney.

Patented Apr. 11, 1950

2,503,554

UNITED STATES PATENT OFFICE 2,503,554

THERMOSTAT

Richard T. Keating, Oak Park, Ill.

Application February 27, 1948, Serial No. 11,399

1 Claim. (Cl. 297—11)

The present invention relates to thermostats, and has for its primary object the provision of a simplified and improved thermostatic control mechanism wherein the parts are so arranged and constructed that the amount of movement of the control parts per unit change in temperature may be varied at will, so that the thermostat may be adjusted to give a length of stroke properly suited to the characteristics of the mechanism with which it is used.

In this connection, it may be pointed out that while thermostats used for making or breaking electrical contacts must necessarily have a sharp cut-off point, yet the types designed to mechanically operate valves, such as gas or steam valves, do not completely open or close the valve at a given instant; instead, they cause it to open and close in a more or less gradual movement. Thus, it is not only desirable to be able to accurately set the thermostat to initiate its opening or closing movement at the exact desired temperature, but it is equally important that the thermostat be so designed that the amount of movement of the valve per unit change in temperature may be accurately regulated as the opening or closing movement of the valve progresses.

A further object of the invention is to provide a thermostat having the functional characteristics indicated above, wherein the several parts are of relatively simple mechanical construction and sufficiently rugged to withstand long use and considerable physical abuse without adversely affecting the performance of the mechanism.

A still further object of the invention resides in the provision of a thermostat having the functional characteristics indicated above, wherein all of the operating parts of the mechanism are housed within a single closed housing which functions as the temperature responsive element, so that the entire thermostat may be submerged in a heated liquid, and the liquid will be in intimate contact with the temperature responsive element of the contact although the working parts of the mechanism will be sealed. This arrangement is particularly well adapted to the control of liquid heaters, such as deep frying equipment, where the temperature responsive element should be submerged in the liquid to achieve the best control.

Referring now to the drawings attached to and forming a part of this specification:

Figure 1 is a central sectional view of a simple form of thermostat constructed in accordance with the present teachings;

Figure 2 is a similar view of a slightly modified form;

Figure 3 is a central sectional view of a second modification;

Figure 4 is a central sectional view of another embodiment of the inventive concept;

Figure 5 is a diagram of the operation of the thermostat; and

Figure 6 is a detail sectional view of a preferred form of pivot contemplated by the invention.

In each form of the invention the working parts of the thermostat comprise a fixed exterior housing and a movable element consisting of a relatively flexible rod extending between a pair of pivots within the housing. This rod is under compression between the pivots, and lies in a bowed condition inside the tube, so that unequal expansion of the housing and rod will increase or decrease the flexing of the bowed section. An actuating member extends out of the housing from the midpoint of the bow, to impart movement to the devices the thermostat controls.

In Figure 1, the housing consists of a longitudinal tube 10 of copper, brass, aluminum or stainless steel, which may be mounted in any convenient manner but which is shown as provided with a side extension or mounting tube 11, so that the tube may be fixed to a mounting surface, and the housing supported at a point spaced away from the mounting. Thus, if the thermostat is to control the temperature of a liquid in a container, the entire housing, which acts as the temperature responsive element, will be immersed in the liquid. Thus, a maximum heat transfer can take place between the liquid and the tube housing, so that the thermostat will respond to changes in temperature of the liquid without undesirable delay. The opposite ends of the tube are sealed by plugs 12 and 13, and a pair of pivots 14 and 15 are mounted in the plugs at the opposite ends of the tube. A yieldable but substantial rod or bow of "Nilvar" or other low expansion alloy extends between the pivots. At least one of the pivots is preferably mounted on a threaded screw 17 which may be adjusted to set the element 16 to the precise degree of initial flexing required. An actuating rod 18 is secured to the bow piece 16 at its center point, and extends outwardly through the tube 11 to actuate any mechanism which the thermostat is intended to control.

It will be seen that with this arrangement the actuating rod 18 will move out of the tube 11 as the temperature of the thermostat is raised and will draw into the tube as it is lowered. This results from the unequal expansion of the copper or brass of the tube 10 and the low expansion alloy of the bow 16. The direction of movement of the parts may be reversed by forming the bow 16 of copper or brass and constructing the tubular housing 10 of low expansion alloy, or by providing an arrangement such as illustrated in Figure 2, wherein the tubular housing 20 and mounting tube 21 of copper or brass are closed with end plugs 22 and 23, and are provided with a bow 26 of "Nilvar." With this arrangement, the pivots 24 and 25 are placed near the other side of the tube so that the center of the bow moves in the opposite direction. The actuating rod 28 is connected to the bow by a screw threaded fitting 29 so that compensation may be made for various degrees of initial flexing in the bow.

The form of the invention shown in Figure 3 includes the housing 30 and mounting tube 31, closure plugs 32 and 33, and pivots 34 and 35, but has the pivot 34, mounted on a fine thread set screw 37, while the pivot 35 is carried by a coarse thread set screw 38. The center of the bow is connected to the actuating rod 39 by a threaded center fitting 41. If desired, the unit may also be provided with an electrical contact 42 on the bow adapted to close a circuit with a mating contact 43 on an insulating bushing 44 in the side wall of the housing 30. The provision of the set screws 37 and 38 provides an effective, yet quick acting, vernier adjustment for the bow. That is, the bow may be quickly set to the approximate position desired by turning the coarse thread screw 38, and the precise adjustment may then be accomplished by manipulation of the fine thread screw 37.

Figure 4 discloses a form of the invention in which the tubular housing 46 is supported at one end. This may be done by threading the end of the housing into a plate or wall 47, so that although the entire internal mechanism of the thermostat is sealed inside the tubular housing, yet the actuating elements may act through an opening in the wall. The outer end of the housing is closed by a plug 48, and the bow 49 is mounted between a pivot 51 on the wall 47 and an adjustable pivot 52 on the thumb screw 53. These pivots, like the pivots previously described, may be of any desired form, but are illustrated as a ball point with a hemispherical socket. This detail is shown in Figure 6.

The center portion of the bow is arranged to bear against a fulcrum 54 formed in a notch in the inner end of a lever 55, which extends outwardly through the end of the housing and through the opening 56 in the wall 47 to a pivot connection with a link 57. The link 57 connects the thermostat with any switch, valve or similar device it is intended to control.

In this form of the invention the lever 55 is provided with an adjustable fulcrum, so that the effective ratio between the movement of the bow and the link 57 may be adjusted as desired. To this end the housing 46 is slotted at 58 and a slide block 59 is positioned within the housing and clamped against the inner wall of the housing by the thumb screw 61 threaded into the block. This provides longitudinal adjustment of the block 59. Transverse adjustment of the position of the fulcrum is accomplished by mounting the fulcrum pivot 62 on the inner end of an adjusting screw 63 threaded in the block. Thus, the fulcrum 62 is shiftable in two directions to accomplish any adjustment desired.

It has been pointed out in the introduction of this specification that it is one of the objects of the invention to provide a thermostat of extremely simple mechanical design and of sturdy and rugged construction, yet arranged so that the degree of movement with which the thermostat responds to a unit change in temperature may be adjusted at will to give the proper stroke for actuating a steam or gas valve, for example. The manner in which this is accomplished will be apparent by examination of Figure 5, where the line 65 represents the straight line position of the bow between the pivots, and the lines 66, 67, 68 and 69 represent the relative amounts of movement imparted to the bow by successive equal units of movement of the opposite pivots. By examination of this figure it will be seen that, when the bow is almost straight initially, a very small degree of inward movement of the opposite pivots will result in a comparatively large flexing of the bow, (represented by the space between the lines 65 and 66) but that further equal inward movements of the end pivots will result in progressively less additional flexing of the bow. Thus, since the movements of the pivots is proportional to the change in temperature, the more the bow is flexed initially, the less it moves in response to a given change in temperature. This means, of course, that the thermostat is well adapted to function over a wide range of temperatures, since the bow when approaching its fully flexed position will respond only very slightly to a comparatively large change.

It is more important, however, that this characteristic of the mechanism makes it possible to adjust the initial flexing of the bow to any desired point. A long stroke may be obtained by employing a very small degree of initial flexing in the bow, so that a unit change in temperature will give a large degree of movement to the actuating rod, as indicated by the space between the lines 65 and 66. If a shorter stroke is desired, the bow may be initially flexed to a greater degree by adjustment of the thumb screws, so as to give a much smaller response to the same unit change in temperature, as indicated, for example, by the distance between the lines 68 and 69. Thus, if it is determined that a particular valve to be controlled by this thermostat should be moved only a short distance at the point of critical temperature, the bow may be adjusted to have a considerable degree of flexing at that temperature. If, however, it is desirable to obtain greater motion, the pivots may be more widely spaced. This will impart a lesser degree of initial flexing in the bow and consequently cause the thermostat to respond to a given change in temperature by a correspondingly greater stroke. The adjustable connections, such as the screw threaded collar 29 of Figure 2 or the collar 41 of Figure 3, permit the bow to be set at any desired initial arc so that the valve controlled by the actuating rod may be opened or closed at the precise point found to be the most desirable.

While I have shown and described the forms of the invention believed to be best suited for an explanation of its operating principles, it will be obvious to those skilled in the art that various other modifications of the inventive concept may be made without departing from the principles of the teaching nor sacrificing all of the advantages gained thereby. It is accordingly pointed out the forms of the invention shown and described here are intended as illustrative only, and not in limitation of the scope of the invention;

and that the scope of the inventive thought extends to any variations or modifications coming within the terms of the appended claim.

Having thus described the invention, what I claim as new and desire to protect by United States Letters Patent is:

A thermostat comprising, in combination, a rigid hollow tubular housing of metal having a relatively high coefficient of thermal expansion, said tubular housing being closed at each end and having an inwardly projecting pivot at each end, with a bow member consisting of a single rod of metal having a low coefficient of thermal expansion with a pivot socket at each end whereby the bow is supported between the two pivots; a central mounting tube supporting the tubular housing; means for altering the spacing between the opposite pivots to exert force on the opposite ends of the bow and thus initially flex the bow to the desired curvature in order that the amount of movement of the body in response to a unit change in temperature may be adjusted; an actuating member connected to the bow at its midpoint and extending out of the housing through the mounting tube; and means for adjusting the relative positions of the actuating member and the bow member in accordance with the degree of initial curvature of the bow.

RICHARD T. KEATING.

REFERENCES CITED

The following references are of record in the file of this patent:

UNITED STATES PATENTS

| Number | Name | Date |
|---|---|---|
| 1,820,461 | Kipper | Aug. 25, 1931 |
| 2,070,433 | Jameson | Feb. 9, 1937 |
| 2,402,312 | Burch | June 18, 1946 |

FOREIGN PATENTS

| Number | Country | Date |
|---|---|---|
| 17,464 | Great Britain | A. D. 1902 |
| 100,788 | Germany | Dec. 28, 1908 |